United States Patent [19]

Todd

[11] Patent Number: 6,002,672
[45] Date of Patent: Dec. 14, 1999

[54] DIVERSITY ANTENNA SELECTION

[75] Inventor: Stephen Ross Todd, Hawa, Canada

[73] Assignee: Nortel Networks Corporation, Montreal, Canada

[21] Appl. No.: 08/777,674

[22] Filed: Dec. 20, 1996

[30] Foreign Application Priority Data

Oct. 25, 1996 [CA] Canada ................................. 2188845

[51] Int. Cl.[6] .................................................. H04B 7/212
[52] U.S. Cl. .......................................... 370/252; 370/334
[58] Field of Search ............................ 455/277.1, 277.2, 455/133, 134, 135; 370/252, 328, 332, 334

[56] References Cited

U.S. PATENT DOCUMENTS

| | | | |
|---|---|---|---|
| 4,495,653 | 1/1985 | Hamada | 455/277 |
| 4,658,096 | 4/1987 | West, Jr. et al. | 379/59 |
| 4,696,058 | 9/1987 | Tachita et al. | 455/277 |
| 4,704,734 | 11/1987 | Menich et al. | 455/33 |
| 4,718,080 | 1/1988 | Serrano et al. | 379/59 |
| 4,737,975 | 4/1988 | Shafer | 379/58 |
| 4,775,997 | 10/1988 | West, Jr. et al. | 379/58 |
| 4,864,642 | 9/1989 | Ueno et al. | 455/277 |
| 4,953,197 | 8/1990 | Kaewell, Jr. et al. | 379/58 |
| 4,959,851 | 9/1990 | Tobolski, Jr. et al. | 379/59 |
| 4,977,615 | 12/1990 | Suzuki et al. | 455/277 |
| 4,977,616 | 12/1990 | Linder et al. | 455/277 |
| 5,067,173 | 11/1991 | Gordon et al. | 359/152 |
| 5,097,484 | 3/1992 | Akaiwa | 375/40 |
| 5,117,450 | 5/1992 | Jogiekar et al. | 379/58 |
| 5,152,009 | 9/1992 | Sato | 455/134 |
| 5,203,024 | 4/1993 | Yamao | 455/133 |
| 5,239,541 | 8/1993 | Murai | 370/77 |
| 5,241,701 | 8/1993 | Andoh | 455/272 |
| 5,369,801 | 11/1994 | Smith | 455/277.1 |
| 5,448,762 | 9/1995 | Ward | 370/347 |
| 5,483,576 | 1/1996 | Staples | 379/58 |
| 5,499,397 | 3/1996 | Wadlin et al. | 455/277.2 |
| 5,507,035 | 4/1996 | Bantz et al. | 455/133 |
| 5,530,926 | 6/1996 | Rozanski | 455/277.2 |
| 5,561,673 | 10/1996 | Taki et al. | 455/277.2 |
| 5,696,798 | 12/1997 | Wright et al. | 455/277.2 |
| 5,734,979 | 3/1998 | Lu et al. | 370/328 |

FOREIGN PATENT DOCUMENTS

| | | | |
|---|---|---|---|
| 0 318 665 | 9/1988 | European Pat. Off. | H04B 7/08 |
| 0 440 239 A2 | 1/1991 | European Pat. Off. | H04B 7/08 |
| 2 254 971 | 10/1992 | United Kingdom . | |
| WO 91/14314 | 9/1991 | WIPO | H04B 7/08 |
| WO 95/09494 | 4/1995 | WIPO . | |
| WO 96/02984 | 2/1996 | WIPO | H04B 7/08 |
| WO 96/08089 | 3/1996 | WIPO | H04B 7/08 |

OTHER PUBLICATIONS

Predictive Antenna Selection Diversitiy (PASD) For TDMA Mobile Radio, 1991 IEEE, by Yasushi Yamao and Yoshinori Nagao, "NTT Radio Communication Systems Laboratories", pp. 1480–1484.

The IEEE Standard Dictionary of Electrical and Electronics Terms/Sixth Edition published by Institute of Electrical and Electronics Engineers, Inc.; IEEE STD 100–1996,; DOC ID SH94459 ISBN 1–55937–833–6; Approved Dec. 10, 1996. see pp. 1095, 1096 brief copy Dec. 1996.

*Primary Examiner*—Chau Nguyen
*Assistant Examiner*—Fred Wolkow
*Attorney, Agent, or Firm*—Jeffrey M. Measures

[57] ABSTRACT

A diversity selection process for a wireless terminal having two antennas is disclosed which tests reception on both the main antenna and a diversity antenna during the period when the terminal is transmitting and tests reception of a different channel (for example, for mobile assisted hand-off) during an idle period when the terminal is neither receiving or transmitting data. The antenna with the greater signal strength is selected for the next frame. Thus, both diversity and mobile assisted hand-off measurements can be made with a single receiver.

23 Claims, 8 Drawing Sheets

DIVERSITY ANTENNA SELECTION

FIELD OF THE INVENTION

The present invention is directed generally to wireless telecommunications, and in particular, it is directed to the technology of antenna diversity, with particular relevance to diversity reception of digital signals used in fixed wireless access applications.

BACKGROUND OF THE INVENTION

In wireless telecommunications, multi-path fading is a known cause of fluctuation in received signal levels and therefore a known cause of deterioration in communication.

Diversity reception has been widely performed, as a method of reducing this fading. For example if two antennas are separated at predetermined distances from each other, there is a significantly reduced probability that the signals from both antennas are simultaneously attenuated to the same extent, hence achieving a higher reliability. For example, signal to Interference margins can be increased by as much as 10 dB when two antennas are used rather than one. Various kinds of diversity reception methods are known.

In most cases, if "perfect" diversity is assumed, a system requires apriori knowledge of the received signal strength indication (RSSI hereafter) at all antennas which can be selected. For many prior art diversity systems, such information can only be achieved through the use of dual receivers. In such an arrangement, the RSSI of the signal received on each antenna is continuously monitored, and the best antenna is selected. This implementation adds considerable cost to a radio receiver.

Some prior art solutions teach diversity receivers which use two or more antennas and one receiver circuit. An antenna selection circuit switches between antennas in response to received signal strength indication generated by the receiver. However, without a dual receiver, the unused antenna must be sampled periodically, resulting in bit hits (lost or corrupted bits) or frame hits (lost or corrupted frames) in the received data whenever the "tested" antenna has a poor RSSI.

Furthermore, these prior art diversity systems have in the past been of particular relevance to base stations and have been of less relevance to user terminals in part due to the requirements of having the antennas physically separated by a minimum distance of half a wavelength. This physical separation of the antennas has typically made it impractical to incorporate such techniques in small, compact mobile terminals. Also, as stated, diversity techniques typically utilize dual receivers which are acceptable for base stations but are not cost effective for terminals.

However, in many ways the problem of multi-path fading presents more of a problem to a fixed wireless access terminal than to a mobile terminal because the subscriber terminal is stationary and therefore the terminal is unlikely to be moved by the user in response to poor reception as a result of a deep fade.

Furthermore, even in situations where multi-path fading does not represent a significant problem, the quality of reception can still be poor as a result of co-channel interference (CCI) in the forward link. This problem is particularly serious in high capacity cellular networks where the desire to reuse frequencies many times can degrade the signal to interference ratio (SIR). However, conventional prior art diversity solutions designed to switch antennas based on a comparison of the received signal strength indication (RSSI) between antennas will not typically solve such a problem.

Another problem not solved adequately by the prior art as known by the inventor herein, is that some users may have their radio link performance limited by the forward link signal strength while other users may have their forward link quality limited by co-channel interference (CCI) due to a high subscriber density. Furthermore, typically, there exists insufficient apriori knowledge to predict which of these two problems is the dominant cause of poor reception. Furthermore, both of the above impairments (i.e., fading and CCI) can occur at various times, and independently of each other. Therefore, there exists a need for an improved diversity system which can improve reception regardless of which impairment causes degraded reception.

SUMMARY OF THE INVENTION

One aspect of the invention provides a diversity selection process, and also a terminal for carrying out the process, while also providing for mobile assisted hand-off (MAHO) measurements. The inventor has identified this as being particularly advantageous for fixed wireless access (FWA) terminals, which do not move in and out of cells and therefore have not previously been set up for hand off. By now providing a FWA terminal with both diversity and MAHO a terminal can improve service by switching antennas for relatively short term problems, or the terminal allows for switching to another basestation (if available) for persistent problems.

Another aspect of the present invention is directed to a process and apparatus for performing antenna diversity which first evaluates the nature of an impairment causing poor reception and then switches antennas accordingly. Such a system is of particular suitability for fixed wireless access terminals using digital radio communications.

It should be noted that these techniques are applicable to any type of antenna scheme where the signals can be suitably decorrelated, regardless of whether such decorrelation is achieved through space or polarization diversity.

BRIEF DESCRIPTION OF THE DRAWINGS

The present invention, together with further objects and advantages thereof will be further understood from the following description of example embodiments with reference to the drawings in which:

FIG. 5 is a flow chart illustrating the conceptual steps according to one embodiment of the invention, for which FIG. 4 represents a specific implementation.

DETAILED DESCRIPTION OF THE PREFERRED EMBODIMENT

The preferred embodiment of the present invention will be described with respect to its application within a subscriber unit such as the fixed wireless access terminal shown in FIG. 1. The preferred embodiments will also be described for IS54-B, TDMA-3. It should be appreciated by a person skilled in the art that this example is used for the purposes of illustration and the invention is also applicable to other systems.

Figure 1:
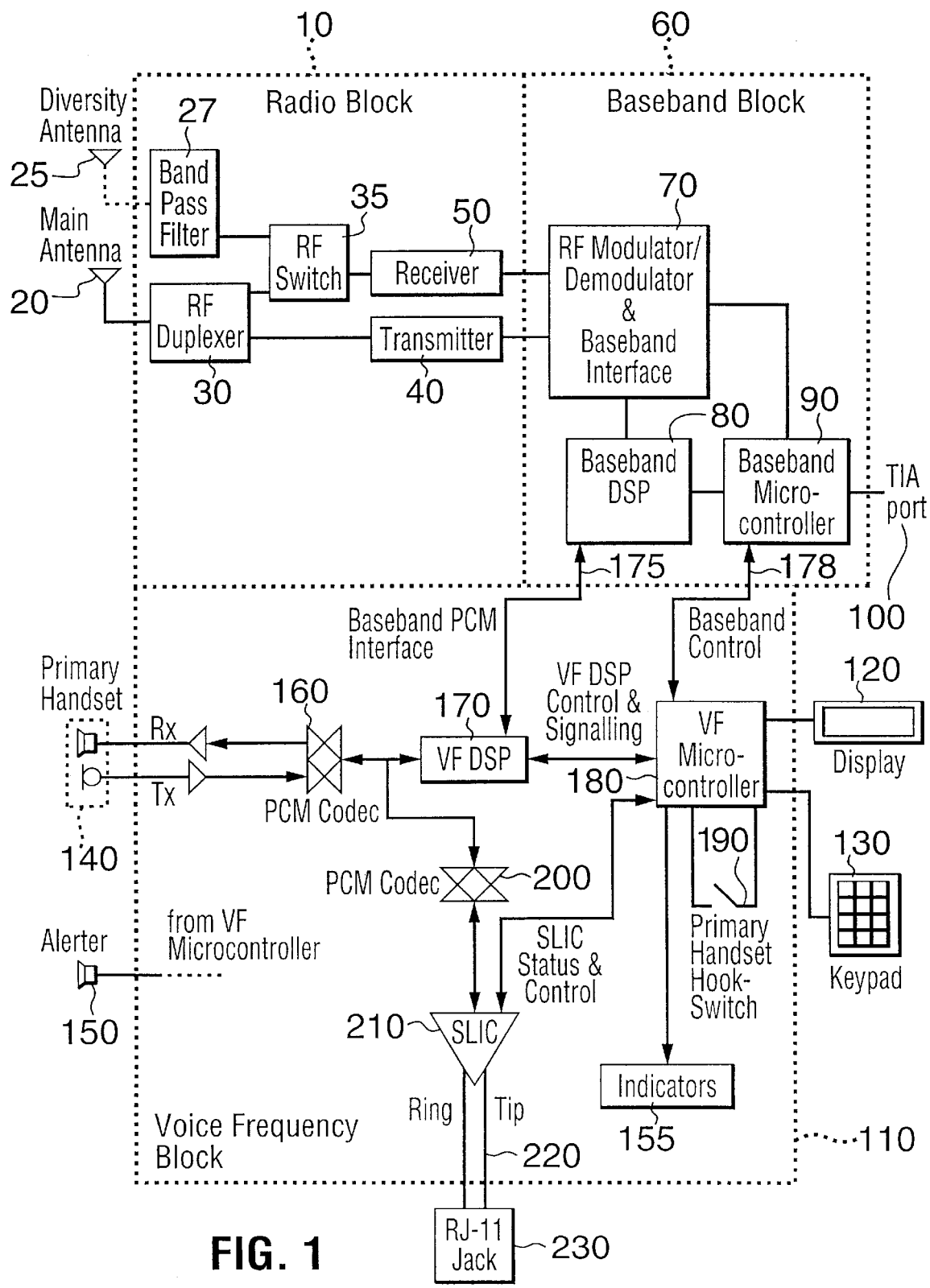
FIG. 1 is a schematic block diagram of a wireless access terminal incorporating a preferred embodiment of the present invention.

In FIG. 1 the terminal (also called subscriber unit) comprises a radio block 10, a baseband block 60 and a voice frequency block 110. There are two interfaces between the baseband block 60, and the voice frequency block 110. The first interface called the PCM interface 175 comprises the digitized voice frequency pulse code modulation (PCM) transmit and receive signals, while the second interface is a bi-directional serial communications interface 178. The radio block 10, and the baseband block 60, provide the conversion between the radio frequency and digitized voice frequency signals. The baseband block 60 is also responsible for handling the protocols associated with the RF link under the control of the voice frequency block 110.

The voice frequency block 110 includes a primary user interface which includes a display 120, a keypad 130, an alerter 150 which produces an audio alert (e.g., ringing) and an indicator which provides visual alerts (e.g., a light indicator indicating, for example, that an extension is off-hook or that an incoming call has been received), and a primary handset 140. The voice frequency block 110 also includes a secondary user interface including RJ-11 jack 230 which acts as an extension jack for a standard analog telephony devices. Note that an additional data jack can be supported.

Not shown is a suitable DC power source. This can comprise a battery, or a suitable AC power adapter, or preferably a combination of the two where ordinarily power is provided from an AC main with battery power as a backup.

In FIG. 1 the radio block 10 is shown to include a main antenna 20 connected to a radio frequency duplexer 30 which is in turn connected to a transmitter block 40 and a RF switch 35. RF switch 35 is connected to a receiver block 50 and selects between an input "a" from RF duplexer 30 or from an input "b" from a bandpass filter 27 which is in turn connected to a diversity antenna 25. An example of the antenna arrangement is described in commonly assigned Great Britain Patent Application GB9616174.0 naming Kitchener as inventor, entitled "An Antenna Arrangement" the disclosure of which is hereby incorporated by reference. However, the actual antenna arrangement is not crucial to the invention. In particular, two or more antennas can be used, which can be spatially separated, or as an alternative, the signals received can have different polarizations. Furthermore, a combination of space and polarization diversity can be used.

Both the receiver 50 and transmitter 40 of the radio block 10 are connected to the RF modulator/demodulator and baseband interface block 70 of the baseband block 60. The baseband block 60 also includes a suitable baseband Digital Signal Processor (DSP) 80 and a suitable baseband microcontroller 90 which is in turn connected to a TIA port 100. The TIA (test interface adapter) port is used to communicate with a data terminal (e.g., a personal computer) using a TIA unit in order to set the terminal into various states and carry out commands and/or procedures either for testing or verification. The Texas Instruments TCM 4300 ARCTIC (Advanced RF Cellular Telephone Interface Circuit) chip is suitable for block 70 and the TI TDMA-3 DSP is suitable for the baseband DSP 80. The baseband microcontroller 90 is a suitable air interface microprocessor which supports the call processing requirement of the IS-54B with extended protocol along with associated memory (e.g. RAM, ROM, EEPROM).

Most of the communications between the radio and baseband blocks takes place via the baseband interface 70. However, as can be seen, a control link, labelled ANTSEL allows the baseband microcontroller 90 to toggle the RF switch 35.

In operation, a communication signal is received at both the main antenna 20 and the diversity antenna 25, where the signal is suitably filtered either by the RF duplexer 30 or the band pass filter 27 respectively. The RF switch 35 determines which of the signals, a or b, are downconverted by the receiver block 50 based on suitable diversity selection process, as discussed below.

The selected signal is downconverted to a suitable IF signal by the receiver block 50. The receiver block 50 also measures the received signal strength and sends a message to the RF demodulator and baseband interface block 70 as to the received signal strength indication (RSSI) as is known in the art. The RSSI is then sent to the baseband microcontroller 90. The baseband DSP 80 also determines the bit error rate (BER) which is also forwarded to the baseband microcontroller. The baseband microcontroller 90 is used to process layers 1 to 3 of the communication protocol stack, to manage the control of the RF radio block 10 and the baseband block 60, and also carries out user interface functions.

The invention is primarily concerned with how to use the RSSI and BER measurements in order to determine how to toggle RF switch 35 in order to select which antenna is to be used for reception.

Figure 2:
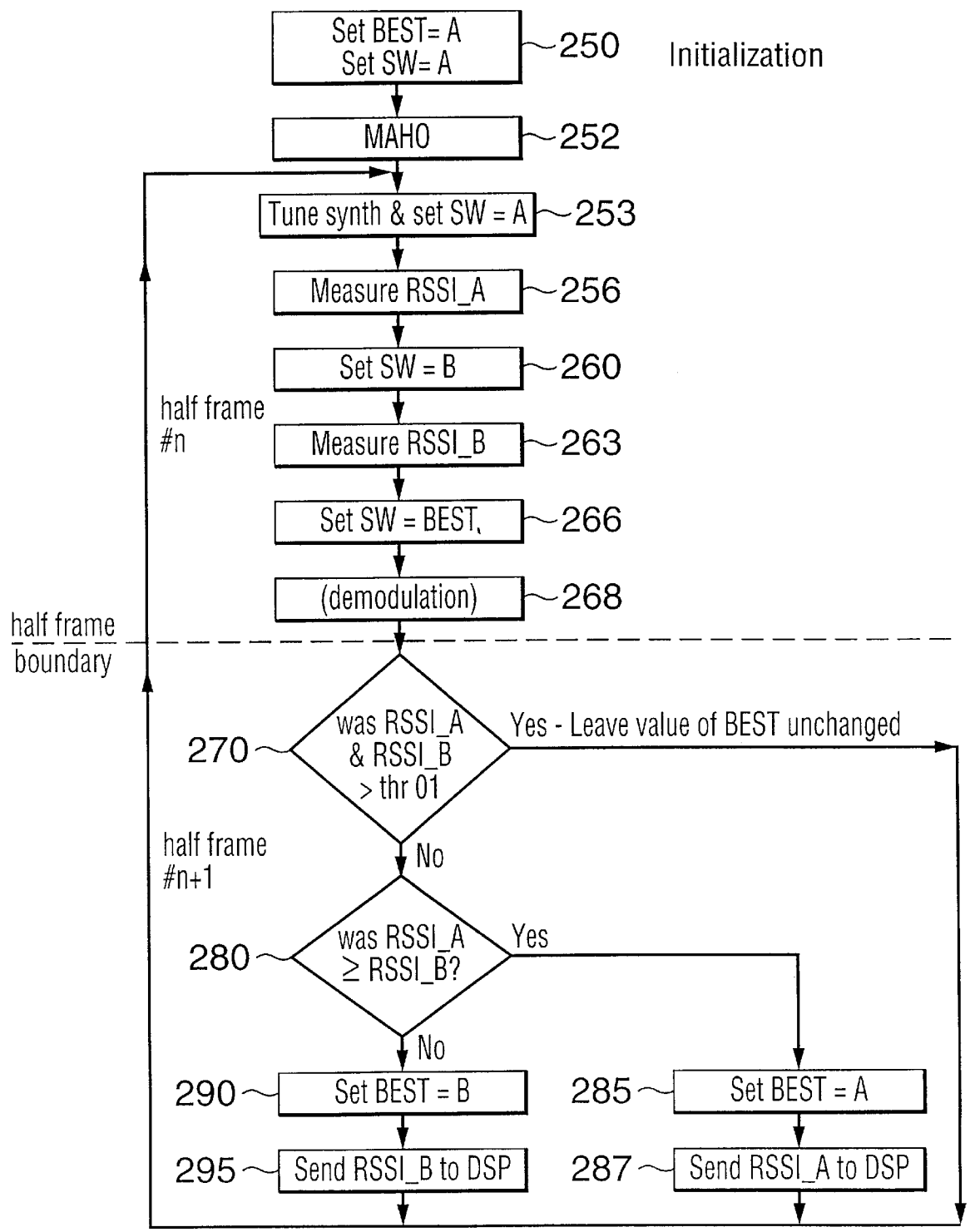
FIG. 2 is a flow diagram illustrating the diversity selection process steps carried out by the baseband microcontroller of FIG. 1, according to one embodiment of the invention.

The diversity selection process according to one embodiment of the invention will be discussed with reference to the flow chart of FIG. 2 and the timing reference shown in FIG. 3. FIG. 2 is a flow chart of the operations carried out by the base band microcontroller 90, according to this embodiment of the invention which is configured for an IS-54 B, TDMA-3 system which supports MAHO. For example, FIG. 2 represents the steps carried out according to software programs stored in an associated memory (not shown) of the microcontroller. It should be noted that this example is described for a TDMA-3 system wherein each frame has 6 timeslots and each frame is divided into two half frames with each half frame having one receive timeslot of interest per user. In the example illustrated in FIG. 3, there are 6 timeslots per frame (3 timeslots for each half frame), wherein timeslots 1 and 4 are of interest to the terminal. FIG. 2 can best be understood with reference to the following definitions:

A=antenna A (main antenna);
B=antenna B (diversity antenna);
SW=RF switch 35 for selecting between A and B;
thr01=parameter defining a suitably high RRSI level such that switching antennas is not required;
"BEST" is a variable that defines which antenna is selected as the best antenna for the next half frame;
RSSI_A=the RSSI value measured on antenna A; and
RSSI_B=the RSSI value measured on antenna B.

In FIG. 2, step 250 represents an initialization step wherein the RF switch 35 is set to receive from the main antenna (A) 20 via RF duplexer 30. Furthermore, this system sets as a default the main antenna A as the best antenna for the next half frame. The system will then receive data, which can be either control information or voice or data from a traffic channel. After reception during the appropriate time slot, for example, time slot 1, is completed there is a period of time before the system transmits data. In this embodiment, which is suitable for IS 54B which is a TDMA/FDD system, this period of time is approximately 3.7 milliseconds (labelled as idle A at 320 in FIG. 3). During this period, as shown at step 252 in FIG. 2, the synthesiser of the receiver 50 is tuned to an another frequency in order to make RRSI (receive signal strength indication) measurements for mobile assisted hand off (MAHO) according to IS-54 B requirements. This allows the MAHO measurements to be made during the idle time when there is no reception or transmission. This has the advantage of preventing transmit leakage through the duplexer during the MAHO measurement, thus allowing an absolute measurement to be made which is unaffected by the transceiver's own transmissions. The system then retunes the synthesiser to the receive channel frequency and the RF switch is toggled to receive from the main antenna A if it is not already as shown at step 253.

The next step as shown at 256 involves a measurement of the RSSI as received at antenna A. Advantageously, this step allows for the measurement of the RSSI of the received channel while the unit is also transmitting data on the transmit channel as can be seen at 345 in FIG. 3. The diversity measurements can be made during transmission because any leakage typically affects both RSSI measurements equally. Thus, the diversity selection process is able to use relative measurements of the two antenna RSSI'S, rather than the absolute measurements generally required for MAHO. However, as shown in FIG. 3, measurements are not made during the transmit slot turn-on period 343 due to the transient affect on one of the RSSI measurements.

In order to compare the RSSI between antennas the RF switch is toggled to select the signal originating from the diversity antenna as shown at step 260. The RSSI value from this signal is then measured at 263. If necessary, the RF switch is reset back to the value associated with the BEST variable at step 266 for reception. In other words, the RSSI measurements are made on both antennas and then the last selected BEST antenna is again selected for the next receive time slot where data is then demodulated at step 268.

After the RSSI measurements are made from both antennas, both values are compared against a threshold value as shown at step 270. If both RSSI_A and RSSI_B are above the threshold value thr01 then both antennas are receiving a sufficiently strong signal. In this case, the value of BEST is unchanged and the system continues to receive with the current antenna. However, if either RSSI_A or RSSI_B are below the threshold value thr01 then the system compares the signal strengths received from each antenna as shown at step 280. If RSSI_A is greater than or equal to RSSI_B then, as shown at step 285, the BEST antenna is set to A. Then, at step 287 the RSSI_A value is sent to the DSP to adjust internal DSP automatic gain control (AGC) in order to avoid bit hits which result when the maximum input level of the baseband demodulator is exceeded. The cycle then continues in the next frame. However, if the RSSI_B was greater than RSSI_A, then correspondingly, as shown at steps 290 and 295, the BEST antenna is set for the diversity antenna B and the RSSI received at antenna B is sent to the DSP, prior to the cycle continuing in the next frame.

Figure 3:
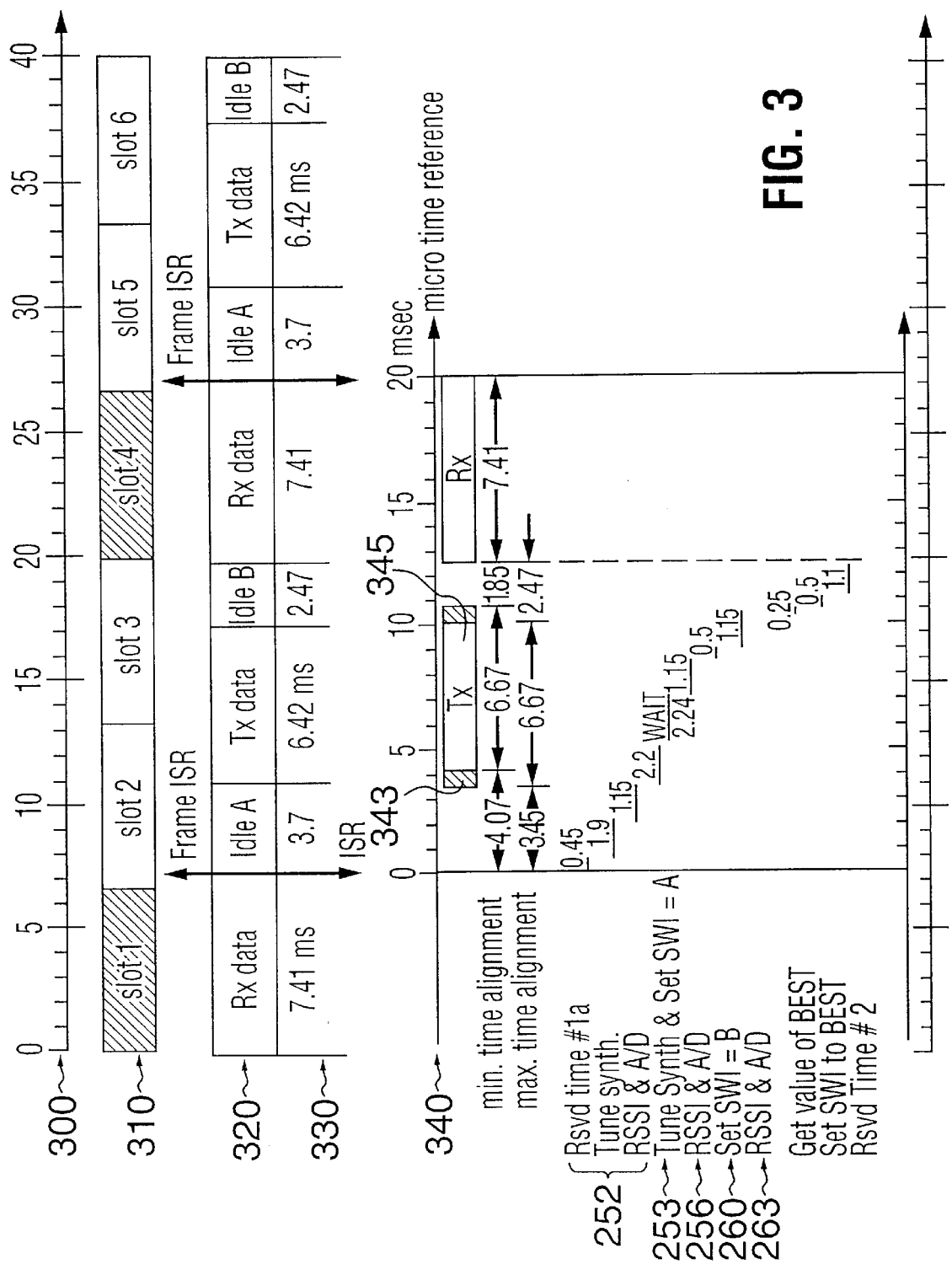
FIG. 3 is a timing reference chart illustrating further aspects of the process of FIG. 2 according to one embodiment of the invention.

As stated above, and as can be seen in FIG. 3, the measurements of the RSSI at antenna A and at antenna B occur during the transmission time slot. As described, the selection process determines which antenna should be used for the next receive slot. As an alternative, given sufficient processing in the time available, the process can determine the antenna to be used for reception during the current half frame. For example, referring to FIG. 3, the terminal receives once every half frame (i.e., every 3 time slots, e.g., timeslot 1, 4, 1, etc.) for a TDMA-3 system. It is preferable, assuming there is sufficient time during Idle B, to select the BEST antenna prior to the start of timeslot 4. However, unless there are very rapid fades, it has been found sufficient to revert to the current antenna for timeslot 4, so that any change in the BEST antenna occurs for the next timeslot (i.e., timeslot 1 in the next frame).

If, as shown in this implementation, the diversity RSSI measurements are made during the transmit burst then, duplexer 30 must have sufficient filtering to prevent the transceiver's own transmissions from interfering with its diversity antenna RSSI measurements. However, for systems with sufficient processing capabilities, it is possible to conduct the RSSI measurements during the idle times between the transmit and receive bursts.

Thus an advantage of the above diversity selection process involves making the diversity measurements as to the BEST antenna to be used, in conjunction with the MAHO measurements, between the end of one receive slot (i.e., a timeslot of interest) and the beginning of the next receive slot. Thus, all of the data in the receive slot is received using the same antenna. Thus bit hits due to RSSI measurements or resulting from switching antennas during a receive slot are avoided.

Preferably, both RSSI_A and RSSI_B represent the average RSSI power levels during the time periods that the measurements are made. Furthermore, in order to avoid "ping ponging" between antennas, a running average of the RSSI power level over more than one half frame can be used. Furthermore the switching rate can be constrained by a hysteresis value M, preventing the switching between antennas unless the outcome of the RSSI comparison is the same for M sequential half frames, where M can take on the values of 1, 2, . . . 255. These refinements are advantageous in situations where the fading is slow or where a demodulator is sensitive to frequent changes to antennas. Such situations typically occur if the two antennas are spaced sufficiently far apart that they see different signal path delays, or in situations where the two antenna signal levels are often drastically different. In these circumstances, either hysterisis, averaging or both can be applied.

The above described diversity selection process is particularly suited to switch antennas in order to avoid multi path fading. According to another embodiment of the invention, the terminal can switch antennas, even if the currently selected antenna has a higher average RSSI, in order to improve poor reception caused by co-channel interference (CCI).

FIG. 4 is a flow chart of the steps carried out by the baseband microcontroller, according to software programs stored in an associated memory (not shown) of the microcontroller, according to an embodiment of the invention which uses both RSSI and BER to determine the antenna selection. In this embodiment, the diversity selection process selects which antenna is used based on testing whether co-channel interference is present, as well as testing for signal level. In the embodiment described, the bit error ratio (BER) is used as a part of the test for CCI performance. As an alternative to measuring the BER, or as a supplement, the system can measure the Coded Digital Verification Colour Code (CDVCC) parity check and confirm that it has been correctly decoded.

FIG. 4 can best be understood with reference to the following definitions:

A=antenna A (main antenna);
B=antenna B (diversity antenna);
SW=RF switch 35 for selecting between A and B;
thr01=parameter defining a suitably high RRSI level such that switching antennas is not required;
"BEST" is a variable that defines which antenna is selected as the best antenna for the next half frame;
RSSI_A=the RSSI value measured on antenna A; and
RSSI_B=the RSSI value measured on antenna B.
"CURRENT" is a variable that defines the current antenna, A or B.
"OTHER" is a variable that defines the other antenna not in use, either B or A.
thr20=a BER threshold parameter set to identify whether or not the BER is OK
"M" is a hysterisis parameter (M=7 for BER hysterisis and M=0 for RSSI based switching. M=7 is chosen for BER to ensure interferer persists and not spurious. 0<M<255)
"Hysteresis Cnt" is a variable used as a counter
"CCI Hold Cnt" is a variable used as a counter
"DF" is a flag used to disable one portion of the code (testing purposes)
"JF" is a flag used to alter operation of algorithm to adjust for different durations of interfering signals thr01=−50 dBm (point at which diversity is enabled (range is −120<thr01<−40)
thr20=0.5% BER (value for deciding if BER is OK), range is 0%<thr20<=8%)
thr21=−90 dBm (value above which RSSI is considered OK, range is −120<thr21<−40)
"Z" is a parameter that defines the length of the CCI hold interval in half-frame increments.

In FIG. 4, steps 402, 404, 406, 408 represent initialization steps wherein the RF switch 35 is set to receive from the main antenna (A) 20 via RF duplexer 30. Furthermore, this system sets as a default the main antenna A as the best antenna for the next half frame. The system will then receive data, which can be either control information or voice or data from a traffic channel. After reception during the appropriate time slot, for example, time slot 1, is completed there is a period of time before the system transmits data. In this embodiment, which is suitable for IS-54B which is a TDMA/FDD system, this period of time is approximately 3.7 milliseconds (labelled as idle A at 320 in FIG. 3). MAHO measurements, if desired, are preferably made during this idle period. The system then retunes the synthesiser to the receive channel frequency and the RF switch is toggled to receive from the main antenna A if it is not already as shown at step 420.

The next step as shown at 423 involves a measurement of the RSSI as received at antenna A. In order to compare the RSSI between antennas the RF switch is toggled to select the signal originating from the diversity antenna as shown at step 426. The RSSI value from this signal is then measured at 429. If necessary, the RF switch is reset back to the value associated with the BEST variable at step 432 for data reception. In other words, the RSSI measurements are made on both antennas and then the last selected BEST antenna is selected for the receive time slot where data is then demodulated at step 435. This RSSI information is saved for use at steps 452 and 465.

The next steps 439 to 449 inclusive determine whether or not the BER is OK. "BER is OK" is a state which is defined based on parameters set and the current BER as demodulated in step 435. If BER is OK the selection process uses the faster RSSI based switching, initiated at step 465 to combat multipath fading. If BER is not OK, then a slower switching process based on signal quality measurements over a number of frames is initiated in step 452 to determine if CCI exists.

Steps 439 to 449 test for determining if BER is OK. After the half frame boundary at step 439, the measured BER from the previous demodulation, step 435, is compared to a threshold value thr20 at step 440. If the BER is less than thr20 then "Hysteresis Cnt" is reset to zero in step 443. If it is not less than thr20 then Hysteresis Cnt is incremented by 1. In step 449 the value of Hysteresis Cnt is then compared to M to decide if BER is OK. These steps 439 to 449 inclusive implement a hysteresis function such that the BER needs to be greater than or equal to thr20 for "M" consecutive half frames before selection process determines that BER is not OK. This prevents incorrect decisions from being made due to burst errors by testing only for non-transient poor BER conditions.

Figure 4A:
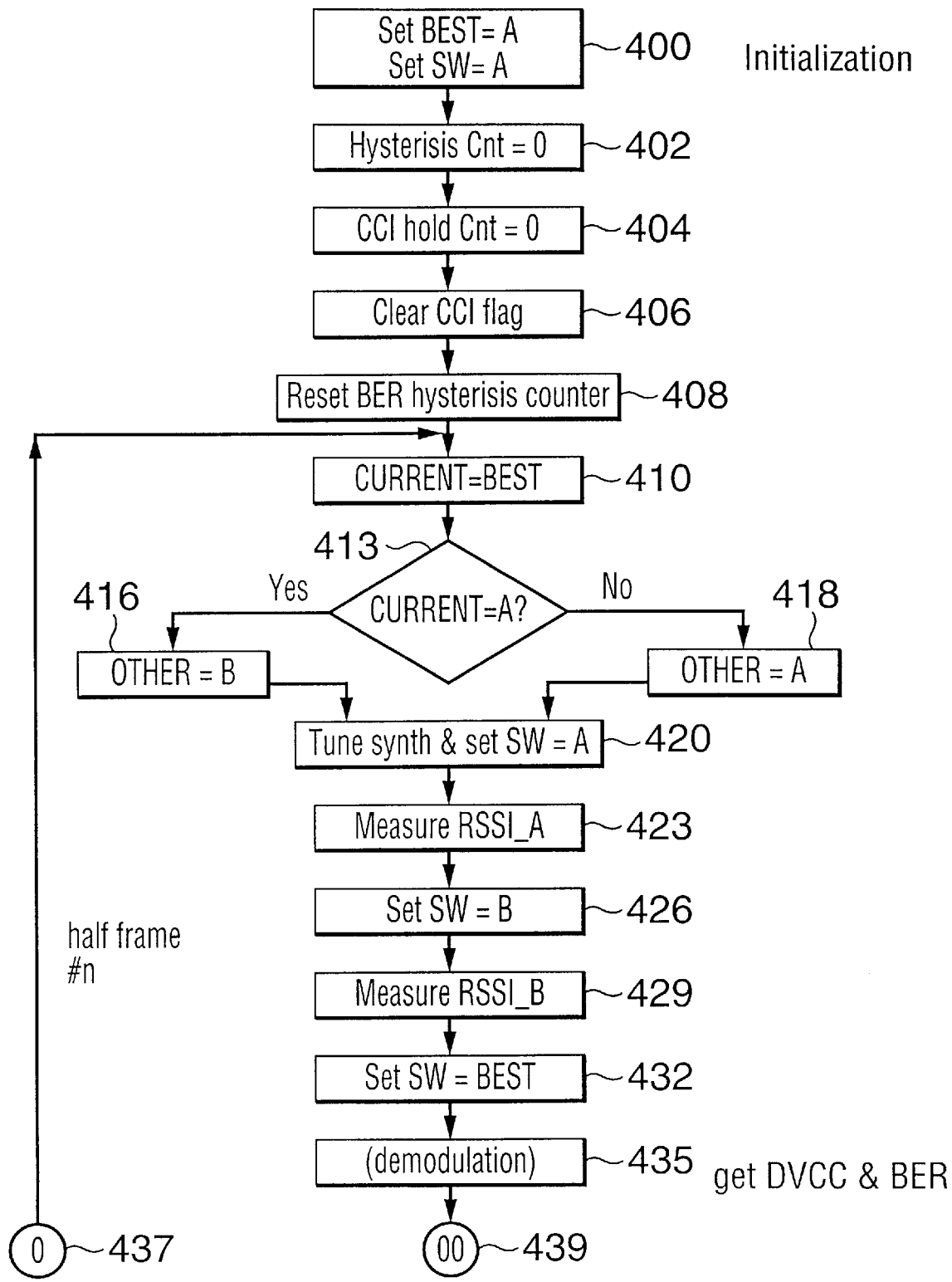
FIGS. 4a–4d is a series of flow charts illustrating the diversity selection process steps carried out by the baseband microcontroller according to another embodiment of the invention.
Figure 4B:
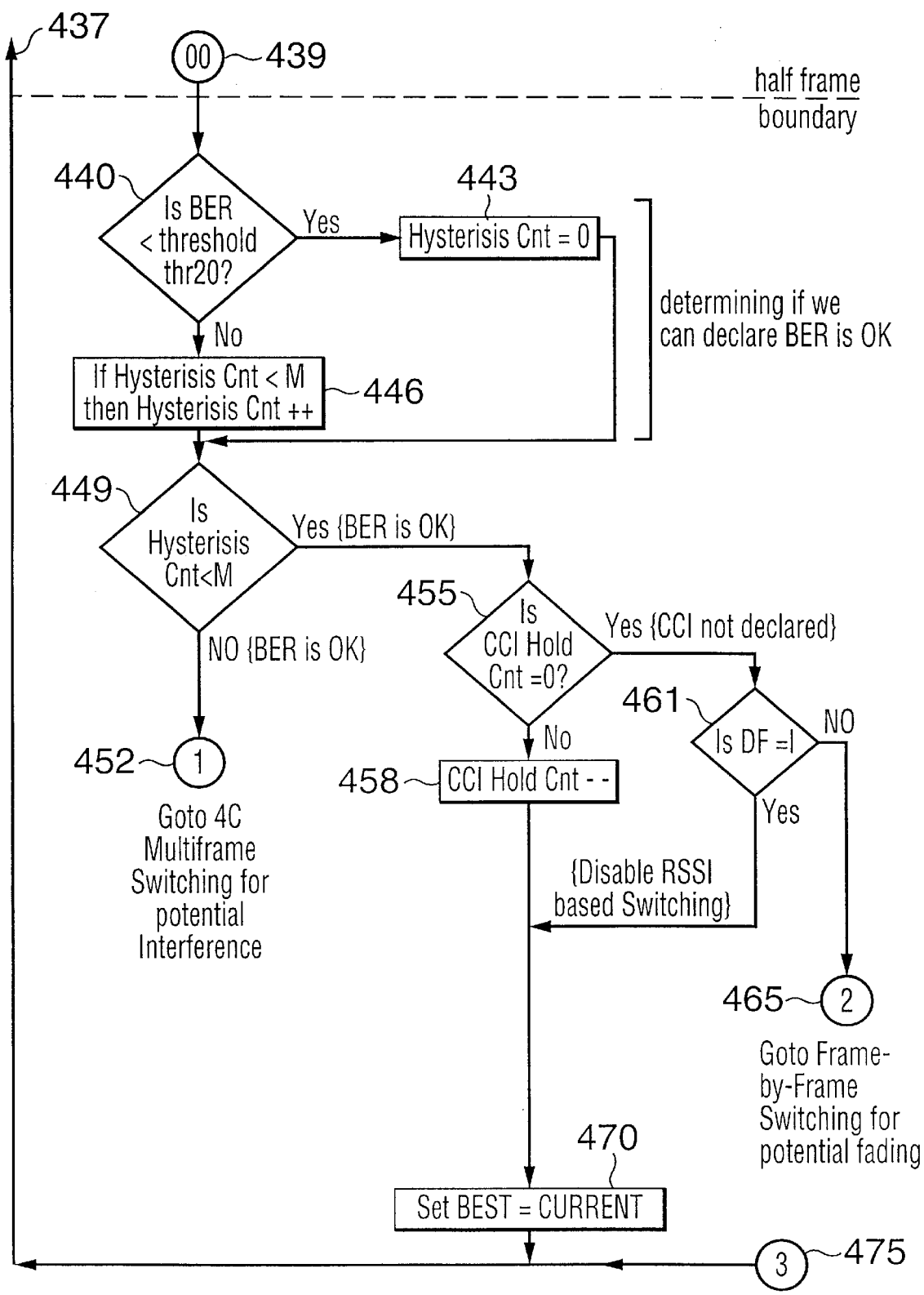
Figure 4C:
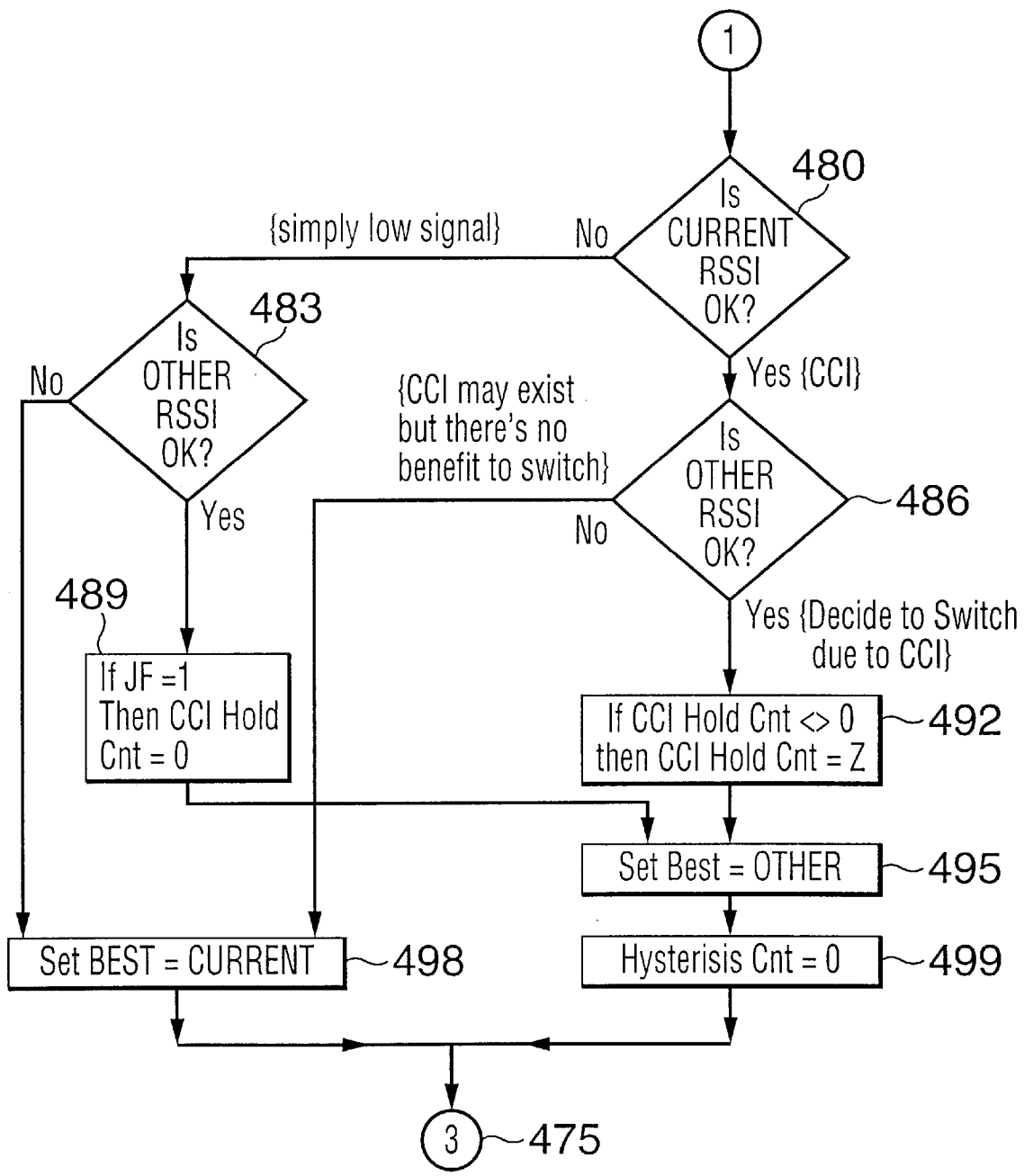

If BER is not OK the slower multiframe based switching is initiated at step 452. FIG. 4c illustrates the steps for implementing the portion of the selection process that makes use of RSSI information and BER information to decide if CCI exists. If so, then antenna switching is driven based on BER such that an alternate antenna, which may have a better SIR due to a different multipath combination of signal and interferer, can be selected.

At step 480 the current antenna RSSI is compared to thr01 in order to determine if RSSI is OK. If the RSSI is OK (i.e., RRSI_Current greater than thr21) then CCI is assumed to exist since the signal strength is good but the BER is not OK, recognizing that RSSI measurements measure signal plus interference power. Step 486 compares the OTHER RSSI to thr01 to decide if it is OK. If OTHER RSSI is OK then the algorithm branches to step 492 and then switches to the OTHER antenna in step 495. The hysteresis counter CCI Hold in step 492 prevents excessive toggling between antennas from occurring by maintaining the selected antenna for Z half frames. This holding on the selected antenna is implemented in conjunction with steps 455, 458 and 470.

At step 486, if the outcome is that OTHER RSSI is not OK, then the algorithm assumes that there is no advantage to switch. Therefore the current antenna remains the best antenna (step 498), thus eliminating unnecessary switching to the other antenna. Excessive or unnecessary toggling between antennas is known to contribute to performance degradation in typical "blind switching" or "switch and stay" algorithms.

At step 480, if CURRENT RSSI is not OK, the poor BER, determined in step 449 is likely caused by low signal strength of the received signal. The selection process then proceeds to step 483 where the OTHER RSSI is tested. If the RSSI of the other antenna is also not OK (i.e., below thr21) then in step 498, the current antenna remains the best antenna. If the OTHER RSSI is OK then a switch to the other antenna is initiated in step 495. Optional step 489 provides an option to jump out of the slow BER based switching (if JF=1) by turning any previously set hold off by setting CCI Hold Cnt=0. This flexibility allows tailoring of the selection process to interference and signal variations found in various propagation environments.

With further reference to step 449, if BER is OK, then a hold check is performed at step 455 to determine whether the current antenna should be maintained due to a recent CCI based switch to it. (This duration is controlled by parameter Z). Step 458 decrements this counter each half frame for which a "hold" condition still exists.

At step 455, if CCI Hold Cnt=0, then both BER is OK and there are no recent switches due to poor BER (i.e., no hold condition exists) so the half frame by half frame RSSI based switching is enabled at step 465 to combat multipath fading. Note that optional step 461 allows for a disable flag DF to be set in order to disable the RSSI based switching, for example, in order to allow testing of the BER based switching only.

Figure 4D:
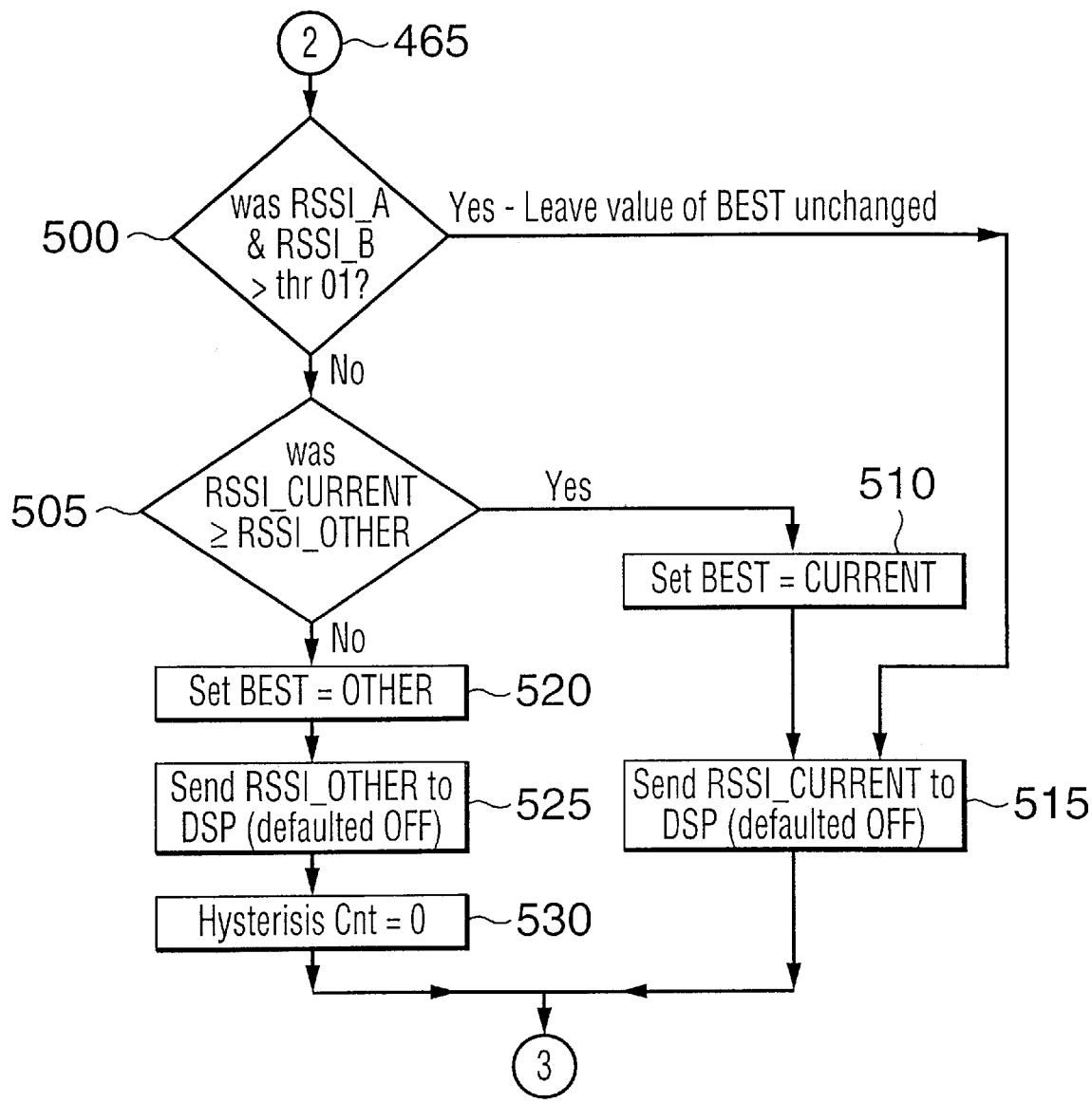

At step 465 the multipath fading based switching process is initiated and the selection process proceeds as shown in FIG. 4D.

RSSI measurements from both antennas are compared against a threshold value as shown at step 500. If both are RSSI_A and RSSI_B are above the threshold variable thr01 then this implies that both antennas are receiving a sufficiently strong signal, therefore no switching of the antenna is required. In this case, the value of BEST is unchanged and the system continues to receive with the current antenna. However, if either RSSI_A or RSSI_B are below the threshold variable thr01 then the system compares the signal strengths received from each antenna as shown at step 505. If RSSI_Current is greater than or equal to RSSI_Other then, as shown at steps 510 and 515, the BEST antenna is set to the current antenna. Optionally, the RSSI_Current value is sent to the DSP to adjust internal DSP automatic gain control (AGC) in order to avoid bit hits which result when the maximum input level of the baseband demodulator is exceeded. This step is shown to be defaulted off as it is typically only required in conditions when the two signals from the two antennas are either fading rapidly or have significant time dispersion between them.

The cycle then continues in the next frame. However, if the RSSI_Other was greater than RSSI_Current, then correspondingly, as shown at steps 520 and 525, the BEST antenna is set for the other antenna and, optionally, the RSSI received at the other antenna is sent to the DSP. As shown at step 530 the Hysteresis Cnt variable is reset to zero prior to the cycle continuing in the next frame as a switch to the other antenna has been selected.

One advantage of the combined RSSI and BER based switching is that it will automatically adjust to different channel conditions, whether degradations are dominated by multipath fading or by CCI.

Note that the preferred embodiment of the design which uses a main antenna and diversity antenna based on polarization diversity effectively provides microscopic diversity. In this case the BER based algorithm relies on the likelihood that the multipath fading on the interferer is different on the alternate antenna. (Note the mean signal and interferer levels will be approximately the same over a duration of a few minutes in the fixed access case).

An alternative embodiment of this invention is to use a remote main antenna whereby the distance separating the main and diversity antenna are larger and hence the mean signal and interferer levels are likely to be different due to shadowing and hence the BER based algorithm can combat longer term poor SIR at the subscriber terminal.

As described, the selection process determines which antenna should be used for the next receive timeslot. Depending on the frame structure and processing time of the system, this can be either the timeslot of interest in the current (half) frame or the timeslot of interest in a subsequent (half) frame.

Figure 5:
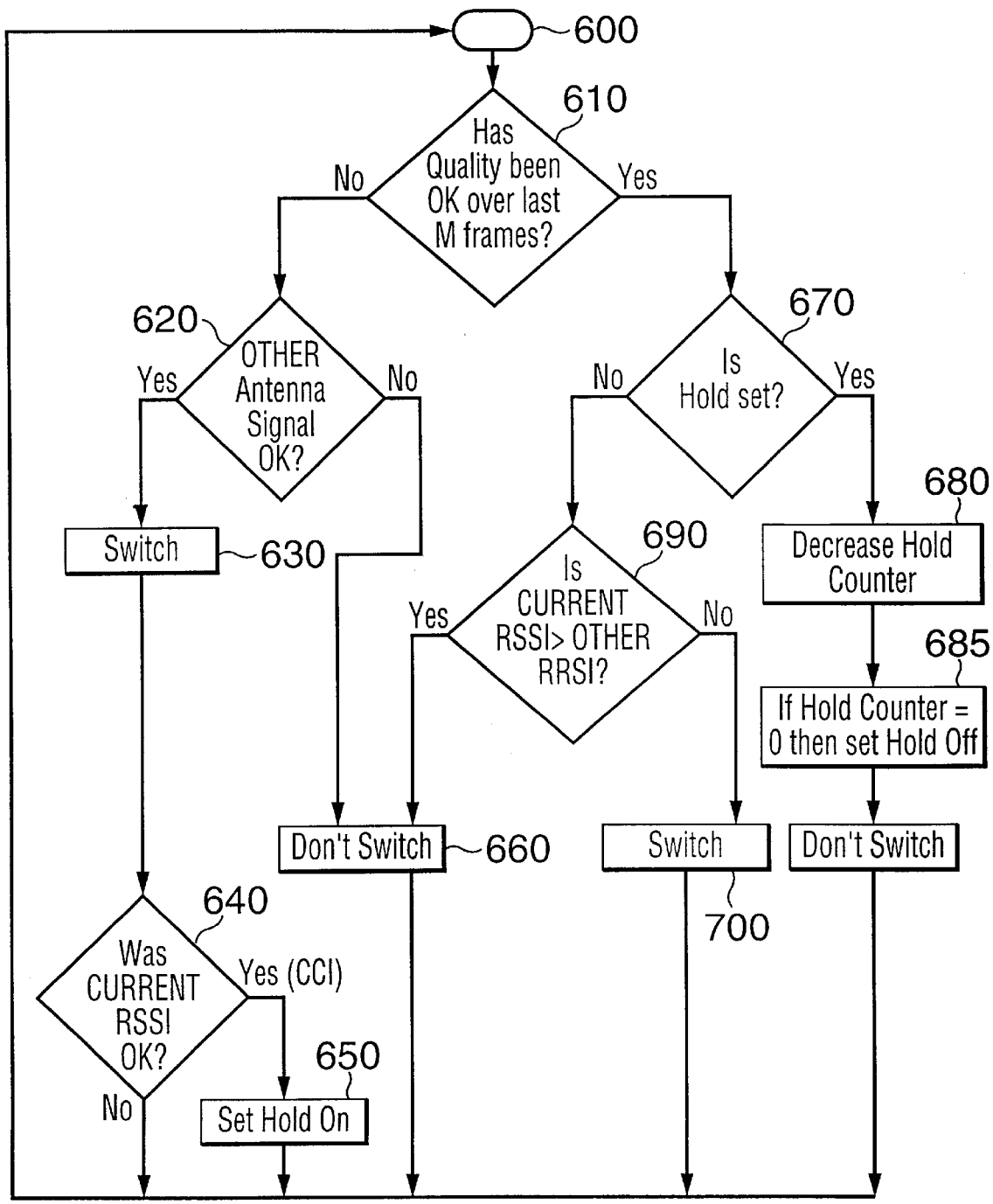

FIG. 5 is a flow chart illustrating the conceptual steps according to one embodiment of the invention, for which FIG. 4 represents a specific implementation. For example, steps 483 and 486 determine whether or not RSSI_Other is OK as a rough estimate of whether the other antenna signal quality is OK. In FIG. 4, this test makes use of the fact RSSI_Other is known. However, other tests, for example testing BER may be preferable in some circumstances especially if additional DSP processing is available.

Step 600 represents the beginning of each frame. In this embodiment, the first step 610 involves evaluating whether a quality indication of the signal received on the current antenna has satisfied a particular condition. Preferably this is determined by evaluating the bit error rate (BER), CDVCC, or both, during each frame and determining whether the quality has satisfied a threshold over M frames. Checking the quality over M frames has the advantage of avoiding excessive switching due to a transient drop in quality. If the test at 610 is not satisfied, the system evaluates whether it is beneficial to select the other antenna due to poor quality on the current antenna. As shown at step 620 an evaluation as to whether the signal received on the other antenna satisfies a second condition is made. The determination of 620 can be made by evaluating the RSSI of the other antenna against an established threshold. However, in some circumstances where there is sufficient processing available, a determination of both the quality and strength of the other antenna can be made. In any event, if the other antenna fails to satisfy the criteria there is no advantage in switching and the selection of the current antenna is maintained as shown at step 660. However, if the evaluation of step 620 indicates that the other antenna does satisfy the condition, it is beneficial to select the other antenna for reception. Therefore, the other antenna is selected as the best antenna at step 630. A determination is then made as to whether the poor quality results from a weak signal, for example due to a fade condition, or alternatively whether the poor quality results from co-channel interference. This determination is made at step 640 by evaluating whether the RSSI satisfied a third condition, for example whether the RSSI exceeded a minimum threshold during the current frame. If the current RSSI failed to satisfy the condition, this is evidence that the quality was poor due to co-channel interference rather than a poor signal strength. Therefore, a hold condition is established at step 650 preventing subsequent switching of the selected antenna for a specified number of frames.

A determination as to whether a hold condition exists is made to prevent switching back to an antenna that was previously deemed to have poor SIR. As shown FIG. 5, the evaluation as to whether the hold is set is made at step 670. A person skilled in the art should note that this hold evaluation could alternatively be made prior to step 610. In any event, if a hold is set, a hold counter, which counts the number of frames since the hold condition was set, is decreased 680 until the hold condition no longer exists 685. In this situation, the selection process continues the next frame with the current antenna selected as the best antenna.

However, if no hold has been set, then at step 690, a determination is made as to which antenna is receiving the stronger signal and that antenna is selected for the next frame. The process then continues into the next frame. In the embodiment described, the quality indication (e.g. BER) is tested over "M" consecutive frames. A test for poor quality could alternatively be satisfied if x out of y consecutive timeslots fail to pass the threshold (e.g., poor quality if 3 out of 4 consecutive frames are poor).

Note that alternative antenna arrangements can be used. For example, a pair of optional remote diversity antennas which are selected by a separate RF switch according to an external communication link from the controller can be used.

Numerous modifications, variations and adaptations may be made to the particular embodiments of the invention described above without departing from the scope of the invention, which is defined in the claims.

We claim:

1. A diversity antenna selection method for a terminal operating in a wireless communication system, said terminal including a single receiver, said method comprising the steps of:
   a) receiving on a previously selected current antenna during a receive timeslot associated with a current channel by said receiver;
   b) testing reception of a different channel received by said receiver;
   c) testing reception of the current channel received by said receiver using said current antenna;
   d) testing reception of the current channel received by said receiver using an alternative antenna; and
   e) selecting the antenna with the best test results as the current antenna for a subsequent receive timeslot; and
   wherein said step (c) comprises the step of testing for indications of signal and co-channel interference of the received signal and wherein step (e) further comprises the steps of:
   A) determining whether the testing of the current antenna indicated the presence either of fading beyond a first threshold or co-channel interference beyond a second threshold, or both;
   B) responsive to the presence of said indication of co-channel interference beyond said second threshold, selecting the other antenna for reception provided said other antenna satisfies a condition and establishing a hold condition preventing subsequent switching of the selected antenna for a specified number of frames;
   C) responsive to the presence of said indication of fading beyond said first threshold, selecting the other antenna provided said other antenna has a greater signal strength and provided no hold condition is in place preventing said selection.

2. A diversity antenna selection method for a terminal operating in a wireless communication system, said terminal including a single receiver which includes a single synthesizer said method comprising the steps of:
   a) receiving on a previously selected current antenna during a receive timeslot associated with a current channel by said receiver;
   b) testing reception of a different channel received by said receiver;
   c) testing reception of the current channel received by said receiver using said current antenna;
   d) testing reception of the current channel received by said receiver using an alternative antenna; and
   e) selecting the antenna with the best test results as the current antenna for a subsequent receive timeslot wherein step b) comprises the steps of:
   tuning said synthesizer to a different channel;
   testing reception on said different channel; and
   then re-tuning said synthesizer to said current channel.

3. A diversity antenna selection method for a terminal operating in a wireless communication system, said terminal including a single receiver which includes a single synthesizer, said method comprising the steps of:
   a) receiving on a previously selected current antenna during a receive timeslot associated with a current channel by said receiver;
   b) testing reception of a different channel received by said receiver;
   c) testing reception of the current channel received by said receiver using said current antenna;
   d) testing reception of the current channel received by said receiver using an alternative antenna; and
   e) selecting the antenna with the best test results as the current antenna for a subsequent receive timeslot wherein step b) comprises the steps of:
   tuning said synthesizer to a different channel;
   testing reception on said different channel when said terminal is neither transmitting nor receiving its receive timeslot; and
   then re-tuning said synthesizer to said current channel.

4. A diversity antenna selection method for a terminal operating in a wireless communication system, said terminal including a single receiver which includes a single synthesizer, said method comprising the steps of:
   a) receiving on a previously selected current antenna during a receive timeslot associated with a current channel by said receiver;
   b) testing reception of a different channel received by said receiver;
   c) testing reception of the current channel received by said receiver using said current antenna;
   d) testing reception of the current channel received by said receiver using an alternative antenna; and
   e) selecting the antenna with the best test results as the current antenna for a subsequent receive timeslot; and
   wherein step b) comprises the steps of:
   tuning said receiver to a different channel;
   testing reception on said different channel when said terminal is neither transmitting nor receiving its receive timeslot; and
   then re-tuning said receiver to said current channel; and wherein both steps d) and e) occur either during a terminal idle period or during a terminal transmit timeslot.

5. The method as claimed in claim 4 wherein said steps (d) and (e) each comprise the step of measuring the received signal strength indication (RSSI) of the received signal and wherein said selecting the antenna step comprises the steps of:
   determining whether the RSSI for either antenna is below a threshold;
   responsive to said determining step determining one of said antenna's RSSI is below said threshold, comparing the RSSI for each antenna to determine which had a stronger RSSI; and
   selecting the antenna with the higher RSSI.

6. The method as claimed in claim 4 wherein said selecting step comprises continuing to receive on the current channel using the current antenna if step (d) satisfies a specified threshold and if not,
   comparing the test reception results received by the alternative antenna with the test reception results received by the current antenna and selecting the antenna with the better results as the next current antenna.

7. A diversity antenna selection method for a terminal operating in a wireless communication system, said terminal including a single receiver which includes a single synthesizer, said method comprising the steps of:
   a) receiving on a previously selected current antenna during a receive timeslot associated with a current channel by said receiver;
   b) testing reception of a different channel received by said receiver;

c) testing reception of the current channel received by said receiver using said current antenna;

d) testing reception of the current channel received by said receiver using an alternative antenna; and e) selecting the antenna with the best test results as the current antenna for a subsequent receive timeslot;

wherein step b) comprises the steps of:

tuning said receiver to a different channel;

testing reception on said different channel; and then re-tuning said receiver to said current channel, and wherein step (c) includes testing both the strength and quality of the received signal and said selection step comprises the steps of:

evaluating whether the quality of the signal received on the current antenna has been above a specified threshold over a specified number of timeslots of interest;

if not, evaluating whether the signal received on the other antenna satisfies a condition, and selecting the other antenna as the current antenna for the next timeslot of interest in the event said condition is satisfied, and, responsive to said other antenna satisfying said condition, evaluating whether the received signal strength of the signal received on the current antenna is sufficient, and indicating there has been a switch in the selection of the current antenna due to poor quality in the event said received signal strength is sufficient; and if so, selecting the other antenna as the current antenna for a subsequent timeslot of interest in the event both the received signal strength of the other antenna is greater than the received signal strength of the current antenna and there has not been a previous switching of antennas due to poor quality within a predefined period.

8. A diversity antenna selection method for a terminal operating in a wireless communication system, said terminal including a single receiver which includes a single synthesizer, said method comprising the steps of:

a) receiving on a previously selected current antenna during a receive timeslot associated with a current channel by said receiver;

b) testing reception of a different channel received by said receiver;

c) testing reception of the current channel received by said receiver using said current antenna;

d) testing reception of the current channel received by said receiver using an alternative antenna; and e) selecting the antenna with the best test results as the current antenna for a subsequent receive timeslot wherein step (e) comprises the steps of:

evaluating whether a quality indication of the signal received on the current antenna satisfies a first condition;

responsive to said quality satisfying said first condition, selecting the antenna with the greater Received Strength Signal Indication (RSSI) as the current antenna for a subsequent receive timeslot provided no previously set hold condition continues to exist;

responsive to said quality not satisfying said first condition:

i) evaluating whether the signal received on the other antenna satisfies a second condition;

ii) responsive to said other antenna signal satisfying said second condition:

A) selecting said other antenna as the current antenna for a subsequent receive timeslot; and B) evaluating whether the received signal strength of the signal received on the current antenna exceeds a threshold, and setting a hold condition for a specified number of timeslots of interest in the event said threshold was exceeded.

9. A diversity antenna selection method for a terminal operating in a wireless communication system, said terminal including a single receiver which includes a single synthesizer, said method comprising the steps of:

a) receiving on a previously selected current antenna during a receive timeslot associated with a current channel by said receiver;

b) testing reception of a different channel received by said receiver;

c) testing reception of the current channel received by said receiver using said current antenna;

d) testing reception of the current channel received by said receiver using an alternative antenna; and e) selecting the antenna with the best test results as the current antenna for a subsequent receive timeslot wherein said testing reception steps each comprise the step of testing for indications of signal fading and co-channel interference of the received signal and wherein said selecting the antenna step comprises the steps of:

A) determining whether the testing of the current antenna indicated the presence either of fading beyond a first threshold or co-channel interference beyond a second threshold, or both;

B) responsive to the presence of said indication of co-channel inteference beyond said second threshold, selecting the other antenna for reception provided said other antenna satisfies a condition and establishing a hold condition preventing subsequent switching of the selected antenna for a specified number of frames;

C) responsive to the presence of said indication of fading beyond said first threshold, selecting the other antenna provided said other antenna has a greater signal strength and provided no hold condition is in place preventing said selection.

10. The method as claimed in claim 9 wherein the step of testing for indications of signal fading comprises evaluating the Received Signal Strength Indication (RSSI) against a specified threshold and wherein the step of testing for indications of co-channel interference comprise evaluating both the received signal strength and a parameter indicative of the quality of the received signal over a number of frames.

11. The method as claimed in claim 10 wherein said parameter comprises the bit error rate or the coded digital verification colour code.

12. A diversity antenna selection method for a terminal operating in a wireless communication system wherein there are multiple frequency channels and wherein for any given frequency channel the terminal receives information on a channel divided into first and second sets of timeslots, for which said first set of timeslots are of interest, and said second set of timeslots are not of interest such that there is a period of time between reception of a first set timeslot and the next first set timeslot, and wherein transmission and reception are on separate frequencies in which transmission is offset in time from reception such that transmission occurs during said period of time, and within said period of time there is also at least one idle period during which there is no information of interest to be received, and no data to be transmitted, said method comprising the steps of:

a) selecting a current antenna;
b) selecting a current channel;
c) receiving on said current channel using said current antenna during a first set timeslot;
d) tuning said receiver to another channel for mobile assisted hand off (MAHO) testing during the at least one idle period;
e) performing Diversity Measurement steps comprising:
   i) re-tuning said receiver to said current channel after said MAHO testing is complete,
   ii) testing reception on said current antenna, and
   iii) testing reception on an alternative antenna;
f) selecting the antenna with the best test results as said current antenna; and
g) receiving on said current antenna during a subsequent first set timeslot;
wherein at least one of Diversity Measurement steps occur during the timeslot allocated to the terminal for transmission in such a manner that said transmission and said Diversity Measurement steps do not significantly interfere with each other.

13. A wireless terminal comprising:
a receiver;
a first antenna;
at least one alternative antenna;
a switch for selecting which antenna provides the input to said receiver; and
a controller adapted for controlling said switch according to the method as claimed in claim 1.

14. A wireless terminal comprising:
a receiver;
a first antenna;
at least one alternative antenna;
a switch for selecting which antenna provides the input to said receiver; and
a controller adapted for controlling said switch according to the method as claimed in claim 2.

15. A wireless terminal comprising:
a receiver;
a first antenna;
at least one alternative antenna;
a switch for selecting which antenna provides the input to said receiver; and
a controller adapted for controlling said switch according to the method as claimed in claim 3.

16. A wireless terminal comprising:
a receiver;
a first antenna;
at least one alternative antenna;
a switch for selecting which antenna provides the input to said receiver; and
a controller adapted for controlling said switch according to the method as claimed in claim 4.

17. A wireless terminal comprising:
a receiver;
a first antenna;
at least one alternative antenna;
a switch for selecting which antenna provides the input to said receiver; and
a controller adapted for controlling said switch according to the method as claimed in claim 7.

18. A wireless terminal comprising:
a receiver;
a first antenna;
at least one alternative antenna;
a switch for selecting which antenna provides the input to said receiver; and
a controller adapted for controlling said switch according to the method as claimed in claim 8.

19. A wireless terminal comprising:
a receiver;
a first antenna;
at least one alternative antenna;
a switch for selecting which antenna provides the input to said receiver; and
a controller adapted for controlling said switch according to the method as claimed in claim 9.

20. A wireless terminal comprising:
a receiver;
a first antenna;
at least one alternative antenna;
a switch for selecting which antenna provides the input to said receiver; and
a controller adapted for controlling said switch according to the method as claimed in claim 12.

21. A wireless terminal comprising:
a single receiver;
at least two antennas;
means for receiving on a previously selected current antenna during a receive timeslot associated with a current channel by said receiver;
means for testing reception of a different channel received by said receiver;
means for testing reception of the current channel received by said receiver using said current antenna;
means for testing reception of the current channel received by said receiver using an alternative antenna; and
means for selecting antenna with the best test results as the current antenna for a subsequent receive timeslot wherein means for testing reception of the current channel received by said receiver using said current antenna includes means for testing both the strength and quality of the received signal and said means for selecting the antenna comprises:
means for evaluating whether the quality of the signal received on the current antenna has been above a specified threshold over a specified number of timeslots of interest;
responsive to a negative evaluation by said means for evaluating whether the quality of the signal received on the current antenna has been above a specified threshold over a specified number of timeslots of interest, means for evaluating whether the signal received on the other antenna satisfies a condition, and selecting the other antenna as the current antenna for the next timeslot of interest in the event said condition is satisfied, and, means, responsive to said other antenna satisfying said condition, for evaluating whether the received signal strength of the signal received on the current antenna is sufficient, and indicating there has been a switch in the selection of the current antenna due to poor quality in the event said received signal strength is sufficient; and responsive to a positive evaluation by said means for evaluating whether the quality of the signal received on the current antenna has been above a specified threshold over a specified number of timeslots of interest, means for selecting the other antenna as the current antenna for a subsequent timeslot of interest in the event both the received signal strength of the other antenna is greater than the received signal strength of the current antenna and there has not been a previous switching of antennas due to poor quality within a predefined period.

22. A wireless terminal comprising:

a single receiver;

at least two antennas;

means for receiving on a previously selected current antenna during a receive timeslot associated with a current channel by said receiver;

means for testing reception of a different channel received by said receiver;

means for testing reception of the current channel received by said receiver using said current antenna;

means for testing reception of the current channel received by said receiver using an alternative antenna; and means for selecting the antenna with the best test results as the current antenna for a subsequent receive timeslot wherein said means for testing reception comprise means for testing for indications of signal fading and co-channel interference of the received signal and wherein said means for selecting the antenna comprises:

A) means for determining whether the testing of the current antenna indicated the presence either of fading beyond a first threshold or co-channel interference beyond a second threshold, or both;

B) responsive to the presence of said indication of co-channel inteference beyond said second threshold, means for selecting the other antenna for reception provided said other antenna satisfies a condition and establishing a hold condition preventing subsequent switching of the selected antenna for a specified number of frames; and C) responsive to the presence of said indication of fading beyond said first threshold, means for selecting the other antenna provided said other antenna has a greater signal strength and provided no hold condition is in place preventing said selection.

23. A wireless terminal for operating in a wireless communication system wherein there are multiple frequency channels and wherein for any given frequency channel the terminal receives information on a channel divided into first and second sets of timeslots, for which said first set of timeslots are of interest, and said second set of timeslots are not of interest such that there is a period of time between reception of a first set timeslot and the next first set timeslot, and wherein transmission and reception are on separate frequencies in which transmission is offset in time from reception such that transmission occurs during said period of time, and within said period of time there is also at least one idle period during which there is no information of interest to be received, and no data to be transmitted, said terminal comprising a receiver, at least two antennas and:

a) means for selecting a current antenna;

b) means for selecting a current channel;

c) means for receiving on said current channel using said current antenna during a first set timeslot;

d) means for tuning said receiver to another channel for mobile assisted hand off (MAHO) testing during the at least one idle period;

e) means for performing Diversity Measurement comprising:

i) re-tuning said receiver to said current channel after said MAHO testing is complete, ii) testing reception on said current antenna, and iii) testing reception on an alternative antenna;

f) means for selecting the antenna with the best test results as said current antenna; and g) means for receiving on said current antenna during a subsequent first set timeslot;

wherein at least one of Diversity Measurement steps occur during the timeslot allocated to the terminal for transmission in such a manner that said transmission and said Diversity Measurement steps do not significantly interfere with each other.

* * * * *

UNITED STATES PATENT AND TRADEMARK OFFICE
CERTIFICATE OF CORRECTION

PATENT NO : 6,002,672
DATED : December 14, 1999
INVENTOR(S) : Stephen Ross Todd

It is certified that error appears in the above-identified patent and that said Letters Patent are hereby corrected as shown below:

Delete:

[75] Inventor: Stephen Ross Todd, Hawa, Canada

Insert:

[75] Inventor: Stephen Ross Todd, Ottawa, Canada

Signed and Sealed this

Twenty-fourth Day of April, 2001

Attest:

NICHOLAS P. GODICI

Attesting Officer

Acting Director of the United States Patent and Trademark Office